No. 666,064. Patented Jan. 15, 1901.
B. V. NORDBERG.
VARIABLE SPEED POWER TRANSMITTING MECHANISM.
(Application filed June 23, 1899.)
(No Model.)
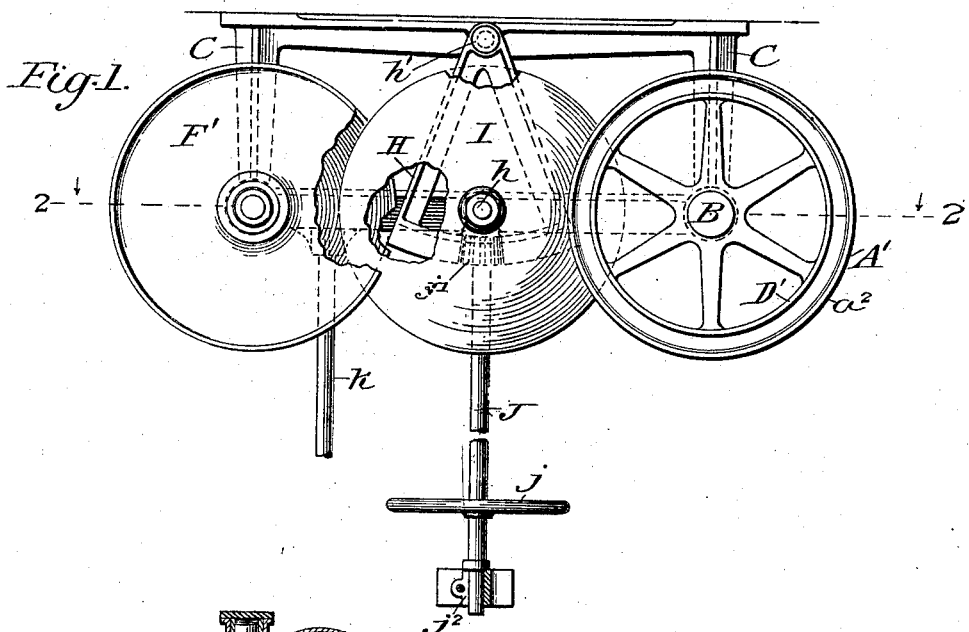
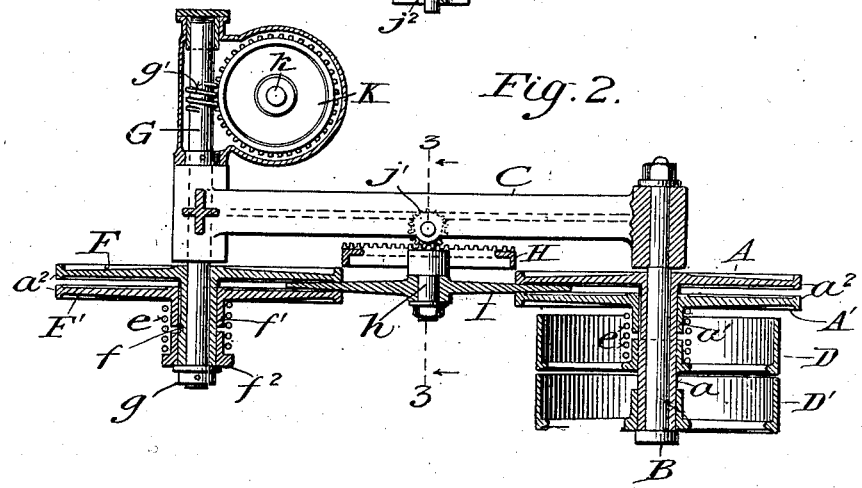
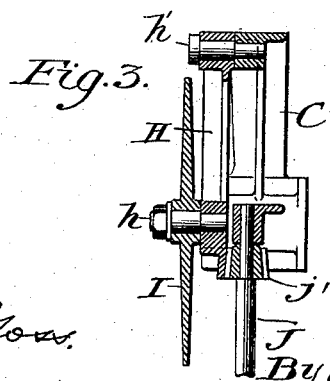
Witnesses:
Chas. L. Goss.
M. L. Emery.
Inventor:
Bruno V. Nordberg,
By Winkler Flanders Smith Bottum & Vilas
Attorneys.

UNITED STATES PATENT OFFICE.

BRUNO V. NORDBERG, OF MILWAUKEE, WISCONSIN, ASSIGNOR TO THE NORDBERG MANUFACTURING COMPANY, OF SAME PLACE.

VARIABLE-SPEED POWER-TRANSMITTING MECHANISM.

SPECIFICATION forming part of Letters Patent No. 666,064, dated January 15, 1901.

Application filed June 23, 1899. Serial No. 721,657. (No model.)

*To all whom it may concern:*

Be it known that I, BRUNO V. NORDBERG, a citizen of the United States, residing at Milwaukee, in the county of Milwaukee and State of Wisconsin, have invented certain new and useful Improvements in Variable-Speed Power-Transmitting Mechanism, of which the following is a specification, reference being had to the accompanying drawings, forming a part thereof.

The main object of my invention is to provide simple, convenient, and effective mechanism for transmitting rotary motion at different rates of speed.

It consists of certain novel features in the construction and arrangement of component parts of mechanism, as hereinafter particularly described, and pointed out in the claims.

In the accompanying drawings like letters designate the same parts in the several figures.

Figure 1 is a side or front elevation of one form of variable-speed power-transmitting mechanism embodying my invention. Fig. 2 is a longitudinal section on the line 2 2, Fig. 1; and Fig. 3 is a cross-section on the line 3 3, Fig. 2.

A A' designate a pair of disks or friction-wheels, which in the device shown in the drawings constitute the driving member of the mechanism. The wheel A is formed with a long hub $a$, which is mounted and turns upon a shaft or spindle B, fixed at one end in a suitable frame or support C. The wheel A' is formed with a hub $a'$, which is fitted to slide endwise upon the hub $a$ and held from turning thereon by a spline or feather. In the present case pulleys D D' are mounted upon the hub $a$ side by side, the pulley D being fixed thereon and serving when connected by a belt with a suitable source of power to turn the friction-wheels A A', and the pulley D' being free to turn upon said hub and serving to carry the belt for the purpose of stopping the transmitting mechanism. Between the pulley D and the wheel A' is interposed a spring $e$, which tends to force said wheel toward the wheel A. These wheels are formed with rims $a^2$ $a^2$ directly opposite each other.

F F' designate friction-wheels like or similar to the wheels A A' and constituting the main driven member of the mechanism. The wheel F is formed or provided on one side with a long hub $f$, mounted upon a shaft G, which is supported parallel with the shaft B and capable of turning in a suitable bearing in the frame C. The hub $f'$ of the other wheel F' is fitted to slide endwise upon the hub $f$, but is held from turning thereon by a spline or feather. The hub of the wheel A is free to move a limited distance endwise upon the shaft B, and the hub of the wheel F is in like manner free to move endwise upon the shaft G, but is held from turning thereon by a spline or feather. Between a collar $f^2$ on the outer end of the hub $f$ and the wheel F' is interposed a spring $e$, which tends to force said wheel toward the wheel F. The hub of the wheel F is held on the shaft G between a collar $g$, mounted upon its outer end, and the frame C. The wheels F F', like wheels A A', are formed with rims $a^2$ $a^2$.

$h$ is a spindle carried between and parallel with the shafts B and G by a frame H, which is pivoted at $h'$ to the frame C, so as to permit of the adjustment of said spindle $h$ toward or from either of said shafts. Upon the spindle $h$ is mounted a disk I, the opposite faces of which converge toward its periphery. It projects on one side and is gripped between the rims of the driving-wheels A A', and on the other side it projects and is gripped between the rims of the driven wheels F F'.

I have shown for the purpose of adjusting the frame or support of the intermediate transmitting-disk I a shaft J, provided with a hand-wheel $j$ and a bevel-pinion $j'$, which meshes with a bevel segment gear or rack formed or provided on the frame H; but other means may be provided for shifting the disk I toward or from either pair of friction-wheels for the purpose of increasing or reducing the speed of the driven member. The hand-wheel shaft J is shown in Fig. 1 as supported at its lower end in a clamping-box $j^2$, by means of which it may be locked when adjusted so as to hold the disk I immovably in any desired position.

I have shown in connection with the driven member a worm $g'$ on the shaft G and a worm-gear K on a shaft $k$ for communicating the transmitted rotary movement to whatever machine or mechanism is to be operated thereby; but I do not limit myself to any specific mechanism for imparting rotary movement to the driving member or communicating it from the driven member to its ultimate work, as the connections between the variable-speed power-transmitting mechanism proper and the source of power on the one hand and the mechanism to be driven on the other hand may be variously changed, according to circumstances, within the spirit and intended scope of my invention.

I claim—

1. In variable-speed power-transmitting mechanism, the combination of a pair of driving and a pair of driven friction-wheels, each pair being yieldingly held together side by side in parallel planes, and both wheels of one pair being moved axially and an intermediate disk having outwardly-converging faces, projecting on opposite sides of its axis between said friction-wheels and adjustable toward and from them, substantially as and for the purposes set forth.

2. In variable-speed power-transmitting mechanism, the combination of a friction-disk having opposite faces converging toward its periphery and adjustable transversely to its axis, a pair of driving and a pair of driven friction-wheels, having their axes parallel with and on opposite sides of the axis of said disk, and provided with inwardly-projecting rims or flanges which are adapted to grip said disk between them, and springs yieldingly holding said wheels in engagement with opposite faces of said disk, both wheels of each pair being movable axially toward and from each other and held constantly in parallel planes, substantially as and for the purposes set forth.

3. In variable-speed power-transmitting mechanism, the combination of parallel driving and driven shafts, friction-wheels mounted on each of said shafts, corresponding friction-wheels mounted and movable endwise upon the hubs of the other friction-wheels, spiral springs interposed between collars on said hubs and the adjacent friction-wheels, and tending to force each pair of wheels together, a frame or support carrying an axle between and parallel with said shafts and adjustable transversely thereto, and a disk having outwardly-converging faces and projecting on opposite sides of its axis between wheels which engage its opposite faces with a yielding frictional contact, substantially as and for the purposes set forth.

4. In variable-speed power-transmitting mechanism, the combination of a frame or support provided with a rack and axle and movable transversely to said axle, a rotary disk mounted upon said axle and having outwardly-converging faces, a pair of driving and a pair of driven friction-wheels having their axes on opposite sides of and parallel with the axis of said disk, each pair gripping said disk between their peripheries, and an adjusting-shaft having a pinion engaging the rack of said axle-support, substantially as and for the purposes set forth.

5. In variable-speed power-transmitting mechanism, the combination of a rotary disk having outwardly-converging faces, a pair of driving and a pair of driven wheels having their axes parallel with and on opposite sides of the axis of said disk, each pair gripping said disk between their opposing sides, both wheels of each pair being movable toward and from the other and held constantly in a plane parallel therewith, means tending to yieldingly force each pair of wheels together, and means for varying the distance between the center of said disk and the centers of said wheels, substantially as and for the purposes set forth.

In witness whereof I hereto affix my signature in presence of two witnesses.

BRUNO V. NORDBERG.

Witnesses:
CHAS. L. GOSS,
KENT H. FLANDERS.